United States Patent [19]

Renner et al.

[11] 4,202,920
[45] May 13, 1980

[54] CYANOACETIC ACID DERIVATIVES AS EPOXY RESIN CURING AGENTS

[75] Inventors: Alfred Renner, Münchenstein; Werner Margotte, Lupsingen, both of Switzerland

[73] Assignee: Ciba-Geigy Corporation, Ardsley, N.Y.

[21] Appl. No.: 954,945

[22] Filed: Oct. 24, 1978

[30] Foreign Application Priority Data

Oct. 25, 1977 [CH] Switzerland ...................... 12966/77

[51] Int. Cl.² ...................... C08G 59/40; C08G 59/44; C08L 63/00
[52] U.S. Cl. .................................. 427/386; 427/388.4; 260/29.2 EP; 528/94; 528/119; 528/118; 528/362
[58] Field of Search .................. 260/29.2 EP, 835; 528/119, 94, 362, 118; 427/386

[56] References Cited

U.S. PATENT DOCUMENTS

| | | | |
|---|---|---|---|
| 2,857,354 | 10/1958 | Fang | 260/33.2 |
| 3,507,831 | 4/1970 | Avis et al. | 260/47 |
| 3,862,150 | 1/1975 | Bechara et al. | 260/268 T |

Primary Examiner—Earl A. Nielsen
Attorney, Agent, or Firm—Joseph F. DiPrima

[57] ABSTRACT

The invention relates to a process for the production of cured shaped articles based on epoxide resins, the compounds used as curing agents being derivatives of cyanoacetic acid, and to compositions for carrying out this process. Such compositions are used for the production of casting resins, laminating resins, lacquers, compression moulding compositions, fluidized-bed sinter powders, adhesives and glass fibre-reinforced plastics.

22 Claims, No Drawings

CYANOACETIC ACID DERIVATIVES AS EPOXY RESIN CURING AGENTS

The invention relates to a process for the production of cured shaped articles based on epoxide resins, the compounds used as curing agents being of a category which hitherto has not been employed for this purpose; some of the compounds are also novel compounds. Furthermore, the invention relates to curable compositions which contain epoxide resins and, as curing agents, compounds of the novel category of curing agents.

It is known to produce solid mixtures which are stable on storage from epoxide resins and curing agents. These are not homogeneous mixtures with glass transition temperatures above room temperature. In these so-called B-stage resins, the reaction is frozen to a certain degree at room temperature. The curing reaction starts again on warming to a temperature above the glass transition temperature. Powder mixtures with separate resin particles and curing agent particles are also used, for example as compression moulding compositions and as fluidised-bed sinter coatings.

Liquid curable mixtures which are stable on storage at room temperature, i.e. so-called one-component systems, which can be cured completely by simple warming, cannot be produced from the epoxide resins and curing agents known at present, such as acid anhydrides, polyamines, dicyandiamide and Lewis acids, such as $BF_3$, $BCl_3$ and $SnCl_4$. Industrially there is an urgent need especially for one-component casting resins, impregnating resins and lacquers which are based on epoxide and are of low viscosity. Furthermore, for ecological and economic reasons it would be desirable to emulsify epoxide resin/curing agent mixtures in water and to use these emulsions as impregnating agents and lacquers. This also is not possible with the known curing agents since they are rendered inactive either by hydrolysis or hydration.

It has now been found that derivatives of cyanoacetic acid as latent, frequently liquid curing agents for epoxide resins are not only suitable for the abovementioned purposes but that, in addition, they also have a number of other advantages for the curing of epoxide resins. They can therefore be put to diverse use, for example for the production of casting resins, compression moulding compositions, laminating resins, lacquers, fluidised-bed sinter powders, adhesives and glass fibre-reinforced plastics. A number of these derivatives are novel compounds. None of the known derivatives has hitherto been used as a curing agent for epoxide resins. It is true that a reaction of ethyl cyanoacetate with an alkene oxide is described in an article by S. A. Glickman and A. C. Cope in Journal of American Organic Chemistry 67, 1012–1016 (1945); however, the resulting products are not substances of high molecular weight but simple α-cyano-γ-lactones.

As compounds most closely related to the cyanoacetic acid derivatives, dicyandiamide and cyanamide are known as curing agents for epoxide resins. Dicyandiamide is a crystalline substance with a melting point of 205°–207° C., which dissolves at 150° C. in a conventional epoxide resin based on bisphenol A, with spontaneous, strongly exothermic decomposition. The biguanide curing agent produced from dicyandiamide and o-toluidine behaves in a similar manner. Cyanamide, which has a melting point of 44° C., decomposes at 140° C. and also cures epoxide resins with a strongly exothermic reaction. These curing agents are therefore restricted to use in thin layers (adhesive bonds and laminates), where the heat of reaction can be removed easily.

The process according to the invention for the production of cured shaped articles based on epoxide resins comprises reacting an epoxide resin with a derivative of cyanoacetic acid as the curing agent, at elevated temperature.

Preferably, the cyanoacetic acid derivative is employed in amounts such that there are 3 to 4, especially 3, epoxide groups per —$CH_2$—CN group. The reaction is preferably carried out at 100°–250° C., especially at 150°–200° C. In many cases an accelerator is advantageously added to the mixture. The cyanoacetyl/epoxide polyaddition responds to base catalysis. In addition to inorganic bases, tertiary amines and heterocyclic nitrogen bases are effective curing accelerators. 2-Phenyl- and 2-methyl-imidazole are particularly suitable.

Cyanoacetic acid derivatives are, in addition to cyanoacetonitrile, advantageously compounds of the formula I

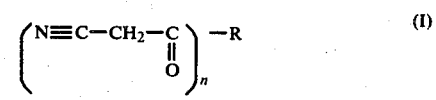

in which R is an amino group, a substituted or unsubstituted hydrazino group or a radical of a monovalent to tetravalent amine or monohydric to tetrahydric alcohol with a partial molecular weight of ≦2,000 and n is the number 1 to 4.

R can preferably be the radical of an aliphatic or araliphatic monohydric to tetrahydric alcohol. Examples are:

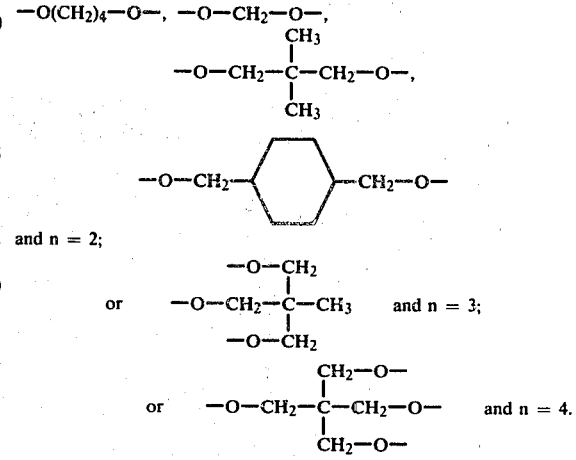

Further preferred compounds of the formula I are those in which R is the radical

in which R′ is an alkyl group having not more than 12 carbon atoms and R″ is hydrogen or an alkyl group having not more than 12 carbon atoms, or R′ and R″ together with N form a heterocyclic ring having 5, 6 or 7 members, and n is 1, especially a compound of this formula in which N, R' and R" form the morpholine radical $$-N\begin{matrix}CH_2-CH_2\\ \\CH_2-CH_2\end{matrix}O$$

Further preferred compounds of the formula I are those in which R is the group —NH—Alk—NH—, in which Alk is an alkylene group having not more than 20 carbon atoms, which can be interrupted by —NH— or —O— bridges, and n is the number 2; for example Alk is a hexamethylene group or the group of the formula $$\begin{matrix}H_3C\\H_3C\end{matrix}\diagdown\bigcirc\diagup\begin{matrix}\\CH_3\ \ CH_2-\end{matrix}$$

The cyanoacetyl curing agents according to the invention are accessible, usually in quantitative yields, by reactions known in principle. Cyanoacetamides are obtained by reacting ethyl cyanoacetate or methyl cyanoacetate with amines. Primary aliphatic amines already react with equivalent amounts of cyanoacetate at room temperature. Secondary aliphatic and aromatic amines require reaction temperatures between 80° and 120° C. and it is advantageous continuously to distil off from the reaction mixture the alcohol formed during the reaction.

Cyanoacetates of higher and polyhydric alcohols can be prepared by transesterification of the methyl or ethyl ester. In this case, tetrabutyl titanate is particularly suitable as the transesterification catalyst. No catalyst is required if free cyanoacetic acid is esterified azeotropically with monohydric or polyhydric alcohols with a boiling point of $>100°$ C. The water formed during the reaction is removed continuously as an azeotrope with toluene or xylene.

Using these processes, cyanoacetates and cyanoacetic acid amides can be obtained in a purity sufficient for the purpose of the invention. In general it is not necessary to purify them by distillation or recrystallisation.

The following are examples of compounds according to the invention (the novel compounds are designated by *) and characterised by some physical properties):

---

NC . CH$_2$ . CN Cyanoacetonitrile Melting point 55° C.

Esters:

E1 NC . CH$_2$ . COO . C$_2$H$_5$

E2 NC . CH$_2$ . COO . C$_4$H$_9$

E3* NC . CH$_2$ . COO . CH$_2$ . CH . C$_4$H$_9$
                                   |
                                  C$_2$H$_5$

Boiling point$_{16}$ = 158°–161° C.
n$_D^\alpha$: 1.4373
Boiling point$_{0.3}$ = 123°–125° C.
n$_D^\alpha$: 1.5190

E4* NC . CH$_2$ . COO . CH$_2$—⬡

E5 NC . CH$_2$ . COO . (CH$_2$)$_2$ . OOC . CH$_2$CN

Resin: η$_{25}$ = 0.27 Pas
n$_D^\alpha$: 1.4628
Melting point: 39°–42° C.

E6 NC . CH$_2$ . COO . (CH$_2$)$_4$ . OOC . CH$_2$CN

Boiling point$_{0.1}$ = 172°–6° C.
Melting point = 37°–39° C.

E7* NC . CH$_2$ . COO . CH$_2$ . C(CH$_3$)$_2$ . CH$_2$ . OOC . CH$_2$ . CN

E8* NC . CH$_2$ . COO . (CH$_2$)$_6$ . OOC . CH$_2$CN

Melting point = 71°–73° C.
Softening point: 85°–90° C.

E9* NC . CH$_2$ . COO . CH$_2$—⬡—CH$_2$ . OOC . CH$_2$CN (mixture of cis/trans isomers)

(Kofler bench)
Resin: η$_{80}$ = 1.44 Pas

E10* NC . CH$_2$ . COO—⬡—C(CH$_3$)$_2$—⬡—OOC . CH$_2$CN

E11* NC . CH$_2$ . COO . CH$_2$CH$_2$ . O—⬡—C(CH$_3$)$_2$—⬡—OCH$_2$CH$_2$ . OOC . CH$_2$CN

Boiling point$_{0.2}$: 48°–60° C.
η$_{80}$ = 1.36 Pas

E12*

NC . CH$_2$ . C(=O)—O . CH$_2$ . CH(OH) . CH$_2$ . O—⬡—C(CH$_3$)$_2$—⬡—O . CH$_2$ . CH(OH) . CH$_2$ . O . C(=O) . CH$_2$ . CN

E13*

-continued

NC.CH$_2$.COO.CH$_2$—[bicyclic structure]—CH$_2$.O.CO.CH$_2$CN     Resin; n$_{25}$: 10.4 Pas; n$_D^\alpha$: 1.5040

E14* NC.CH$_2$.COO$+$CH$_2$.CH$_2$.O$)_{\overline{14}}$—OC.CH$_2$CN

E15* NC.CH$_2$.CO$+$O—CH$_2$.CH$_2$$)_{\overline{13}}$—OCOCH$_2$CN

E16* CH$_3$.CH$_2$.C$+$CH$_2$O.CO.CH$_2$CN)$_3$     Resin; n$_{25}$: 56.8 Pas; n$_D^\alpha$: 1.4813

E17* C$+$CH$_2$O.CO.CH$_2$.CN)$_4$

E18*

NC—CH$_2$—C(=O)—O—CH$_2$—C(CH$_3$)(CH$_3$)—CH$_2$—[O—CO—C$_6$H$_4$—CO—O—CH$_2$—C(CH$_3$)(CH$_3$)—CH$_2$—]$_4$—O—C(=O)—CH$_2$—CN

Softening point = 60° C.
Boiling point$_{0.1}$ = 101°–103° C.
n$_D^\alpha$: 1.4657

Amides:

A1 NC.CH$_2$.CONH$_2$

A2 NC.CH$_2$.CONH.CH$_3$

A3 NC.CH$_2$.CON(C$_2$H$_5$)$_2$

A4 NC.CH$_2$.CO.NH.CH$_2$.CH(CH$_3$)$_2$     Boiling point$_{0.1}$ = 106°–108° C.

A5 NC.CH$_2$.CO.NH.CH$_2$.CH(C$_4$H$_9$)(C$_2$H$_5$)     Boiling point$_{0.1}$ = 131°–133° C.; n$_D^\alpha$: 1.4674; n$_{25}$: 0.235 Pas A6* NC.CH$_2$CONH(CH$_2$)$_3$.N(CH$_3$)$_2$     Boiling point$_{0.1}$ = 105°–107° C.; n$_D^\alpha$: 1.4762; n$_{25}$: 0.140 Pas A7* NC.CH$_2$.CO.NH(CH$_2$)$_3$.N(C$_2$H$_5$)$_2$     Boiling point$_{0.4}$ = 134° C.; n$_D^\alpha$: 1.4801; n$_{25}$ = 1.125 Pas

A8* NC.CH$_2$.CONH(CH$_2$)$_3$.O.(CH$_2$)$_4$.O.(CH$_2$)$_3$.NH.COCH$_2$CN

A9* NC.CH$_2$CON(C$_4$H$_9$)$_2$     Boiling point$_{0.4}$: 150°–154°; n$_D^\alpha$: 1.4604; n$_{25}$: 0.037 Pas

A10 NC.CH$_2$.CO.NH.C$_2$H$_5$

A11 NC.CH$_2$.CO.N[morpholino]O

A12 NC.CH$_2$.CO.NH.NH—C$_6$H$_5$

A13* NC.CH$_2$.CO.NH.CH$_2$—C$_6$H$_5$

A14* NC.CH$_2$CONH(CH$_2$)$_6$NHCOCH$_2$.CN     Melting point: 144°–146° C.

A15* NC.CH$_2$.CONH.CH$_2$.C(CH$_3$)$_2$.CH$_2$.C(CH$_3$)(CH$_3$).CH$_2$.CH$_2$.NH—CO—CH$_2$—C≡N

A16* [3,3,5-trimethyl-5-(cyanoacetamidomethyl)cyclohexyl]—NH.CO.CH$_2$.CN     Soft resins with a softening point at room temperature

A17* NC.CH$_2$.CONH.CH$_2$.CH$_2$NH.CH$_2$.CH$_2$.CO.CH$_2$CN

A18* NC.CH$_2$.CO.NH(CH$_2$CH$_2$NH)$_3$CO.CH$_2$CN.     Melting point: 123°–128° C.

Cyanoacetic acid derivatives of higher molecular weight can have the formula III

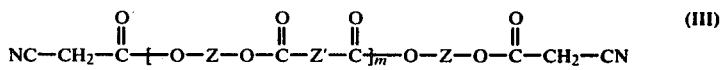

In this formula, Z is a glycol radical, for example, the radical of ethylene glycol, propylene glycol, butane-1,4-diol, hexane-1,6-diol or the like, and Z' is a dicarboxylic acid radical, for example the radical of phthalic acid, isophthalic acid, adipic acid or the like, and m is a number from 2 to 20.

These derivatives are prepared by first preparing polyesters with hydroxyl end groups by known processes (either in the melt or in solution with azeotropic removal of the water formed during the reaction) from dicarboxylic acids or their anhydrides and excess glycols and then reacting these polyesters with cyanoacetic acid or the methyl or ethyl esters thereof in the manner which has already been described for the preparation of cyanoacetates of higher and polyhydric alcohols.

Homogeneous mixtures, which in many cases are liquid and are of low viscosity, with epoxide resins can be produced from the cyanoacetic acid derivatives listed; these mixtures have a good storage stability and below 150° C. have no tendency to an exothermic reaction. These systems are particularly suitable for solvent-free stoving lacquers and for aqueous emulsion paints. The exothermic reaction at higher temperatures is so slight that even relatively large castings can be produced without difficulty. Despite high glass transition temperatures, the cured mouldings are not brittle but have high flexural strength and impact strength.

The storage stability, which below temperatures of 100°-140° C. is excellent, can be so changed by adding basic accelerators that the temperature threshold is lowered. Such systems are particularly suitable for compression moulding compositions and fluidised-bed sinter powders.

Suitable epoxide resins are the known aliphatic, aromatic and heterocyclic polyepoxides. Particularly preferred epoxide resins are those produced from bisphenol A, epichlorohydrin and sodium hydroxide solution; the glycidyl ethers of polyhydric alcohols and also the glycidyl esters of phthalic acid isomers and their tetra- and hexa-hydro derivatives can also be used. Glycidyl amines are also suitable as resin components. In these cases, it is not necessary to use any basic accelerators. Outstanding properties are obtained when N,N'-tetraglycidyl-4,4'-diaminodiphenylmethane is completely cured with cyanoacetyl compounds, with shaping.

In the following examples parts are by weight.

EXAMPLE 1

(a) 384 parts of a technical grade diglycidyl ether of bisphenol A with an epoxide equivalent weight of 192 and 0.576 part of 2-phenylimidazole are heated to 100° C., with stirring, in a reaction vessel provided with a stirrer, a thermometer, a reflux condenser and a dropping funnel. A solution of 170 parts of cyanoacetic acid in 170 parts of ethyl acetate is then added dropwise, the mixture being warmed so that ethyl acetate starts to reflux at not too great a rate.

After 2.5 hours at 90°–95° C., the addition of the acid solution has ended and after a further 4 hours at 90° C. 0.12 epoxide equivalent per kg of reaction mixture is still detectable. The ethyl acetate is distilled off and removed completely at 130° C. and 15 mm Hg in a rotary evaporator.

525 parts of a pale yellow resin-like adduct (E12) which is virtually solid at room temperature and has the following characteristics are obtained:

| Acid number: | 5 mg KOH/g |
|---|---|
| Nitrogen: | 5.3% |
| Epoxide: | 0.05 equivalent/kg. |

(b) 2.1 parts of the adduct and 2.9 parts of diglycidyl ether of bisphenol A are mixed, with warming, and the mixture is poured into a circular aluminium mould, which is open at the top and has a diameter of 5 cm, and cured for 6 hours at 120° C., 6 hours at 140° C. and 4 hours at 180° C.

A pale brown, tough small plate with a glass transition temperature of 92° C. is obtained.

EXAMPLE 2

22.96 parts of cyanoacetamide (A1) (melting point=118°–120° C.) are dissolved in 117.04 parts of N,N'-tetraglycidyl-4,4'-diaminodiphenylmethane, with warming. The solution is poured into 120×120×2 mm and 120×120×4 mm moulds and cured for 14 hours at 140° C. and 4.5 hours at 180° C. The following properties are measured on the flawless 2 mm and 4 mm thick sheets:

| Flexural strength (VSM 77,103) | : 181 N/mm² |
|---|---|
| Deflection (VSM 77,103) | : 5.28 mm |
| Impact strength (VSM 77,105) | : 1.71 Ncm/mm² |
| Heat distortion point (ISO R 75) | : 203° C. |
| Swelling in boiling water in the course of 1 hour | : 0.83% |
| Volume resistivity (DIN 53,482) | : 6.1 × 10¹⁵ Ωcm |
| Dielectric constant | : 4.7 |
| tan δ at 50 Hz | : 1.42% |

EXAMPLE 3

14.0 parts of cyanoacetamide (A1), 126.0 parts of resin A: technical grade diglycidyl ether of bisphenol A with an epoxide content of 5.2 equivalents/kg and a viscosity at 25° C. of 10 Pas, and 0.7 part of 2-phenylimidazole are mixed homogeneously, with warming, and the mixture is poured into 120×120×2 mm and 120×120×4 mm sheet moulds, and cured for 6 hours at 140° C. and 4 hours at 180° C.

The resulting 2 mm and 4 mm thick sheets have the following properties:

| Flexural strength (VSM 77,103) | : 125 N/mm² |
|---|---|
| Deflection (VSM 77,103) | : 5.5 mm |
| Impact strength (VSM 77,105) | : 2.1 N . cm/mm² |
| Heat distortion point (ISO R 75) | : 119° C. |
| Swelling in water (1 hour at 100° C.) | : 0.95% |
| Volume resistivity (DIN 53,482) | : 5.9 × 10¹⁵ Ω . cm |
| Dielectric constant | : 4.3 |
| tan δ at 50 Hz | : 0.69% |

EXAMPLE 4–7

The following epoxide resins are used:
A: Epoxide resin according to Example 3
B: Polyfunctional semi-solid epoxide/phenol/novolac resin with an epoxide content of 5.5 equivalents/kg and a viscosity of 35–70 Pas at 52° C.
C: Diglycidyl ether of neopentylglycol (epoxide content 7.6 equivalents/kg)
D: Triglycidyl ether of trimethylolpropane (epoxide content 8.8 equivalents/kg)

The mixtures of the resins A-D with cyanoacetonitrile (melting point = 55° C.) which are described in the following table are cured for 6 hours at 120° C., 6 hours at 140° C. and 4 hours at 200° C. In other respects the procedure is as in Examples 2 and 3.

TABLE 1

Curing of various epoxide resins with N≡C . CH$_2$ . C≡N

| Example No. | 4 | 5 | 6 | 7 |
|---|---|---|---|---|
| Parts of resin A | 119.6 | — | — | — |
| Parts of resin B | — | 118.4 | — | — |
| Parts of resin C | — | — | 112 | — |
| Parts of resin D | — | — | — | 108.6 |
| Parts of cyanoacetonitrile | 20.4 | 21.6 | 28 | 31.4 |
| Parts of 2-phenylimidazole | 2.8 | 2.8 | 2.8 | 2.8 |
| Flexural strength (N/mm$^2$) | 148.8 | 166.7 | 116.5 | 150 |
| Deflection (mm) | 7.4 | 7.4 | 3.8 | 9.1 |
| Impact strength (N . cm/mm$^2$) | 3.05 | 1.33 | 1.17 | 1.78 |
| Heat distortion point (°C.) | 164 | 198 | 72 | 133 |
| Swelling in the course of 1 hour in H$_2$O at 100° C. (%) | 0.42 | 0.46 | 4.24 | 2.27 |
| Volume resistivity ($\Omega$ . cm) | $4.8 \times 10^{-16}$ | $7.3 \times 10^{-15}$ | $1.2 \times 10^{-15}$ | $2.6 \times 10^{-15}$ |
| Dielectric constant | 4.2 | 4.3 | 4.9 | 5.1 |
| tan $\delta$ at 50 Hz (%) | 0.64 | 0.62 | 0.7 | 1.63 |
| Tracking resistance according to DIN 53,480 | KA 3 a/b | KA 3 | KA 3 d | KA 3 a/b |

EXAMPLE 8

Ethyl cyanoacetate (E1) is mixed with variable amounts of resin A (cf. Example 3) and the mixtures are pre-gelled at 80° C. and then completely cured in stages of 4 hours at 100° C., 4 hours at 120° C., 4 hours at 160° C. and 6 hours at 180° C. The results of the physical measurements on the test pieces are given in Table 2. It is seen that the mechanical and dielectric properties are only slightly dependent on the weight ratio of resin to curing agent; this is advantageous for the application.

| | | | |
|---|---|---|---|
| Parts of resin A | 88.2 | 108 | 113.4 |
| Parts of ethyl cyanoacetate (E1) | 51.8 | 32 | 26.6 |
| Parts of phenylimidazole | 0.7 | 0.7 | 0.7 |
| Flexural strength (N/mm$^2$) | 128.4 | 137.5 | 138.0 |
| Deflection (mm) | 8.0 | 8.1 | 8.2 |
| Impact strength (N . cm/mm$^2$) | 4.0 | 5.4 | 4.3 |
| Heat distortion point (°C.) | 104 | 99 | 102 |
| Swelling in the course of 1 hour in H$_2$O at 100° C. (%) | 0.33 | 0.34 | 0.27 |
| Volume resistivity ($\Omega$ . cm) | $2.1 \times 10^{16}$ | $1.6 \times 10^{16}$ | $2.3 \times 10^{16}$ |
| Dielectric constant | 4.0 | 4.0 | 4.0 |
| tan $\delta$ at 50 Hz (%) | 0.99 | 0.84 | 1.10 |
| Tensile shear strength (according to DIN 53,283) (on glued Anticorrodal sheets) | 12.6 | 13.7 | 12.7 |

EXAMPLE 9

59.5 parts of neopentyl bis-cyanoacetate (E7), obtained by transesterification of ethyl cyanoacetate with neopentylglycol in the presence of catalytic amounts of Ti(OC$_4$H$_9$)$_4$ and purified by distillation (boiling point 0.1 = 180° C., $n_D^\alpha$ = 1.4560), are mixed with 106.4 parts of N,N,N',N'-tetraglycidyl-p,p'-diaminodiphenylmethane (epoxide content 9.4 equivalents/kg, viscosity 25 Pas at 50° C.) and the mixture is cured in the same way as described in

EXAMPLE 8

The following properties are measured on the cured product:

| | |
|---|---|
| Flexural strength (N/mm$^2$) | 126.4 |
| Deflection (mm) | 3.5 |
| Impact strength (N . cm/mm$^2$) | 0.94 |
| Heat distortion point (°C.) | 146 |
| Swelling in the course of 1 hour in H$_2$O at 100° C. (%) | 1.67 |
| Volume resistivity ($\Omega$ . cm) | $1.7 \times 10^{14}$ |
| Dielectric constant | 5.4 |
| tan $\delta$ at 50 Hz (%) | 1.91 |

EXAMPLE 10

The resin-like ester E11, which is obtained by transesterification of bisphenol A di-2-hydroxyethyl ether with ethyl cyanoacetate, also in the presence of butyl titanate, is mixed with the resin A (cf. Example 3) and phenylimidazole in the amounts indicated in Table 3 and the mixture is cured in the same way as described in Example 8.

The physical properties measured can be seen from Table 3.

| | | |
|---|---|---|
| Parts of resin A | 88.2 | 100.8 |
| Parts of ester E11 | 51.8 | 39.2 |
| Parts of phenylimidazole | 1.4 | 1.4 |
| Flexural strength (N/mm$^2$) | 137.3 | 154.7 |
| Deflection (mm) | 4.5 | 8.9 |
| Impact strength (N . cm/mm$^2$) | 1.9 | 1.6 |
| Heat distortion point (°C.) | 85 | 90 |
| Swelling in the course of 1 hour in H$_2$O at 100° C. (%) | 0.96 | 0.57 |
| Volume resistivity ($\Omega$ . cm) | $7.5 \times 10^{15}$ | $5.7 \times 10^{15}$ |
| Dielectric constant | 4.0 | 4.0 |
| tan $\delta$ at 50 Hz (%) | 0.36 | 0.31 |

In this case also it is seen that the mechanical and dielectric properties are only slightly dependent on the weight ratio of resin to curing agent.

EXAMPLE 11

25.2 parts of cyanoacetic acid isobutylamide (A4), obtained by transesterification of ethyl cyanoacetate with isobutylamine and purified by distillation (boiling point $0.1 = 106°-108°$ C., $n_D^\alpha = 1.4319$, melting point $45°-46°$ C.) are mixed homogeneously with 100 parts of technical grade diglycidyl ether of bisphenol A with an epoxide content of 5.2 equivalents/kg and 0.5 part of dimethylbenzylamine and the mixture is poured into 4 mm thick sheet moulds and cured, first for 4 hours at $80°$ C. and then for 6 hours at $120°$ C. The mouldings have the following properties:

| Flexural strength (N/mm$^2$) | 114 |
|---|---|
| Deflection (mm) | 8.1 |
| Impact strength (kg/m$^2$) | 55.8 |
| Heat distortion point (°C.) | 113 |
| Swelling in H$_2$O (1 hour/100° C.) (%) | 0.53 |
| Volume resistivity ($\Omega$ . cm) | $3.6 \times 10^{15}$ |

The adhesive bond on Anticorrodal gave a tensile shear strength value (N/mm$^2$) of 23.2.

EXAMPLE 12

The procedure in Example 11 is repeated except that 33.8 parts of hexamethylene-bis-cyanoacetamide (A14), obtained by reacting ethyl cyanoacetate with hexamethylenediamine, are used as the curing component. This formulation is cured for 6 hours at $140°$ C.

The following spectrum of properties is obtained:

| Flexural strength (N/mm$^2$) | 110 |
|---|---|
| Deflection (mm) | 2.4 |
| Impact strength (kg/m$^2$) | 20.8 |
| Heat distortion point (°C.) | 151 |
| Swelling in H$_2$O (1 hour/100° C.) (%) | 0.62 |
| Volume resistivity ($\Omega$ . cm) | $9.7 \times 10^{15}$ |
| Dielectric constant | 4.4 |

EXAMPLES 13-14

1,4-Cyclohexanedimethanol-bis-cyanoacetate (E9), obtained by azeotropic esterification of cyanoacetic acid with 1,4-cyclohexanedimethanol, is reacted with the following epoxide resins.

Resin A (see Example 3) and

Resin E

N,N,N',N'-tetraglycidyl-4,4'-diaminodiphenylmethane. Epoxide content 9.4 equivalents/kg.

The mixtures described in the following table, some of which are accelerated, are completely cured at $100°/120°/140°/160°/180°$ C., for 4 hours at each temperature.

| | | |
|---|---|---|
| Parts of resin A | 112.8 | — |
| Parts of resin E | — | 97.4 |
| Parts of E9 | 27.2 | 42.6 |
| Parts of phenylimidazole | 1.4 | — |
| Flexural strength (N/mm$^2$) | 154.1 | 100.1 |
| Deflection (mm) | 8.2 | 2.97 |
| Impact strength (kg/m$^2$) | 20.0 | 5.25 |
| Heat distortion point (°C.) | 122 | 184 |
| Swelling in H$_2$O (1 hour/100° C.) (%) | 0.22 | 0.25 |

EXAMPLES 15-16

The procedure of Example 11 is repeated except that 2,2-bis-(p-cyanoacetoxy-cyclohexyl)-propane (E10), obtained by azeotropic distillation, is used as the curing component.

| | | |
|---|---|---|
| Parts of resin A | 105.5 | — |
| Parts of resin E | — | 88.2 |
| Parts of E10 | 34.5 | 51.8 |
| Flexural strength (N/mm$^2$) | 103.5 | 109.3 |
| Deflection (mm) | 3.5 | 3.0 |
| Impact strength (kg/m$^2$) | 42.4 | 5.6 |
| Heat distortion point (°C.) | 112 | 176 |
| Swelling in H$_2$O (1 hour/100° C.) | 0.32 | 0.19 |

EXAMPLES 17+18

Esters E16 and E6 are obtained by azeotropic esterification of cyanoacetic acid with trimethylpropane and with 1,4-butanediol respectively.

Mixtures of the two cyanoacetyl compounds with epoxide resin A are described in the following table. The resulting properties are also listed in the table.

| | | |
|---|---|---|
| Parts of resin A | 117.3 | 117.3 |
| Parts of E16 | 22.7 | — |
| Parts of E6 | — | 22.7 |
| Parts of phenylimidazole | 1.4 | 1.4 |
| Curing | 12 hours/110° C. | 8 hours/160° C. |
| | 4 hours/120° C. | 8 hours/200° C. |
| | 4 hours/140° C. | |
| Flexural strength (N/mm$^2$) | 117.2 | 135.2 |
| Deflection (mm) | 6.8 | 8.1 |
| Impact strength (kg/m$^2$) | 37.2 | 47.3 |
| Heat distortion point (°C.) | 124 | 110 |
| Swelling in H$_2$O (%) | 0.27 | 0.37 |

EXAMPLE 19

The 1,4-cyclohexanedimethanol-bis-cyanoacetate (E9) already described in Example 13-14 is used in combination with epoxide resin A in an aqueous lacquer emulsion.

| Parts of resin A | 24.2 |
|---|---|
| Parts of E9 | 5.8 |
| Part of phenylimidazole | 0.3 |
| Part of a wetting agent consisting of nonylphenol and ethylene oxide; "Triton" X 705 (Rohm + Haas) | 0.3 |
| Methylcellulose 4000 | 0.3 |
| Flow control agent (Fluorochemical FC 430 from 3M Company) | 0.3 |
| Water | 30.0 |

This emulsion, applied in a thin layer (about 0.025 mm) to a grease-free aluminium or iron sheet and stoved for 15 minutes at $205°$ C., gives a glossy film which adheres well. Bending and folding of the sheet metal results in no damage to the film. The mechanical stress tests on a film of this type gave the following values:

| Persoz hardness (seconds) | 351-357 |
|---|---|
| Erichsen deep drawing value (cm) (on sheet steel) | 8.1-8.3 |
| Impact test/impact strength: | |
| Sheet steel (film side) | ⎫ |
| Sheet steel (rear) | ⎬ 90 cm/2 kg |
| Sheet aluminium (film side) | ⎭ |

| Sheet aluminium (rear) | | |
|---|---|---|

EXAMPLES 20–21

Reaction of dimethylaminopropylamine and diethylaminopropylamine with ethyl cyanoacetate yields the corresponding cyanamides A6 and A7.

Mixtures of these two compounds with epoxide resin A and the mechanical properties of the resulting mouldings are listed in the following table.

| Parts of resin A | 100 | 100 |
|---|---|---|
| Parts of A6 | 22.8 | — |
| Parts of A7 | — | 26.6 |
| Curing | 4 hours/80° C. | 6 hours/120° C. |
| Flexural strength (N/mm$^2$) | 65 | 114 |
| Impact strength (kg/m$^2$) | 19.3 | 52 |
| Deflection (mm) | 3.3 | 7.5 |
| Heat distortion point °C. | 96 | 90 |
| Swelling in H$_2$O (4 days/room temperature, in %) | 0.5 | 0.46 |
| Tensile shear strength (bending on Anticorrodal) (N/mm$^2$) | 20 | 18 |

What is claimed is:

1. A process for the production of a cured shaped article, based on epoxide resins, which comprises reacting at elevated temperature an epoxide resin with a curing agent selected from the group consisting of cyanoacetonitrile or a compound of the formula (I)

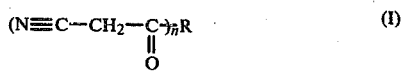

wherein R is an amino group, a substituted or unsubstituted hydrazino group or a radical obtained by the removal of an amine hydrogen or hydroxyl hydrogen from an amine or a monohydric to tetrahydric alcohol with a partial molecular weight of 2,000 or less and n is 1 to 4.

2. A process according to claim 1, wherein the curing agent is employed in an amount such that there are 3 to 4, epoxide groups per —CH$_2$—CN group.

3. A process according to claim 1, which comprises warming the mixture of epoxide resin and curing agent to a temperature of 100°–250° C.

4. A process according to claim 1, wherein a nitrogen base, is added as an accelerator to the mixture of epoxide resin and curing agent.

5. A process according to claim 2, wherein the curing agent is employed in an amount such that there are 3 epoxide groups per —CH$_2$—CN group.

6. A process according to claim 3, which comprises warming the mixture of epoxide resin and curing agent to a temperature of 150°–200° C.

7. A process according to claim 4, wherein the nitrogen base is 2-phenylimidazole.

8. A process according to claim 1, wherein the curing agent is a compound of the formula I in which R is the radical of an aliphatic or araliphatic monohydric to tetrahydric alcohol.

9. A process according to claim 1, wherein the curing agent is a compound of the formula I in which R is the radical of an alkanediol having 2 to 10 carbon atoms and n is the number 2.

10. A process according to claim 1, wherein the curing agent is a compound of the formula I in which R is the group

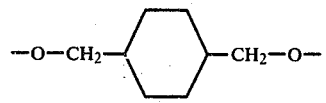

and n is the number 2.

11. A process according to claim 1, wherein the curing agent is a compound of the formula I in which R is the radical

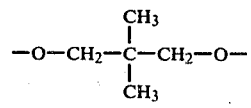

and n is the number 2.

12. A process according to claim 1, wherein the curing agent is a compound of the formula I in which R is

in which R' is an alkyl group having not more than 12 carbon atoms and R" is hydrogen or an alkyl group having not more than 12 carbon atoms, or R' and R" together with N form a heterocyclic ring having 5, 6 or 7 members, and n is 1.

13. A process according to claim 12, wherein N-isobutyl-cyanoacetamide is used as the curing agent.

14. A process according to claim 1, wherein the curing agent is a compound of the formula I in which R is the group —NH—Alk—NH—, in which Alk is an alkylene group having not more than 20 carbon atoms, which can be interrupted by —NH— or —O— bridges, and n is the number 2.

15. A process according to claim 14, wherein Alk is a hexamethylene group.

16. A process according to claim 1, wherein the curing agent is a polyester of higher molecular weight obtained from dicarboxylic acids, glycols and cyanoacetic acid or a lower ester thereof.

17. A process according to claim 1, wherein the epoxide resin used is N,N,N',N'-tetraglycidyl-4,4'-diaminodiphenylmethane.

18. A process according to claim 1, which comprises emulsifying a mixture, which is liquid at room temperature, of an epoxide resin and the curing agent in water, applying the emulsion to a metal surface and stoving the film, thus formed, at a temperature between 100° and 300° C.

19. A process according to claim 18, wherein the stoving is performed at a temperature between 160° and 220° C.

20. A composition for carrying out the process according to claim 1, which contains an epoxide resin and the curing agent for the said resin.

21. A composition according to claim 20, wherein the resin and curing agent are present in a liquid mixture.

22. A composition according to claim 21, wherein the liquid resin/curing agent mixture is emulsified in water.